United States Patent [19]

Wetterau, Jr.

[11] Patent Number: 4,654,818

[45] Date of Patent: Mar. 31, 1987

[54] DATA PROCESSING DEVICE HAVING MEMORY SELECTIVELY INTERFACING WITH COMPUTER

[75] Inventor: Lin C. Wetterau, Jr., Lubbock, Tex.

[73] Assignee: Texas Instruments Incorporated, Dallas, Tex.

[21] Appl. No.: 562,167

[22] Filed: Dec. 16, 1983

[51] Int. Cl.⁴ ............ G06F 13/00; G06F 15/16; G06F 15/20

[52] U.S. Cl. .................... 364/900; 364/419; 364/704

[58] Field of Search ... 364/200 MS File, 900 MS File, 364/401, 464, 709, 419, 704, 707; 365/228

[56] References Cited

U.S. PATENT DOCUMENTS

| | | | |
|---|---|---|---|
| 3,823,388 | 7/1974 | Chadima, Jr. | 364/900 |
| 4,005,388 | 1/1977 | Morley et al. | 364/200 |
| 4,180,805 | 12/1979 | Burson | 340/709 |
| 4,335,447 | 6/1982 | Jerrim | 364/900 |
| 4,348,740 | 9/1982 | White | 364/900 |
| 4,369,442 | 1/1983 | Werth et al. | 364/479 |
| 4,381,552 | 4/1983 | Nocilini | 364/900 |
| 4,387,296 | 6/1983 | Newell et al. | 235/376 |
| 4,415,065 | 11/1983 | Sandstedt | 186/39 |
| 4,433,387 | 2/1984 | Dyer et al. | 364/900 |
| 4,460,965 | 7/1984 | Trehn et al. | 364/464 |
| 4,509,138 | 4/1985 | Hayashi et al. | 364/900 |
| 4,523,297 | 6/1985 | Ugon et al. | 364/900 |
| 4,532,416 | 7/1985 | Berstein | 235/379 |

FOREIGN PATENT DOCUMENTS 2082814 3/1982 United Kingdom ............ 364/464

OTHER PUBLICATIONS

Electronics Review, Hand-held Terminal to Give Held Troops Access to Data Nets, (Electronics, Nov. 11, 1976) pp. 29-30.

Primary Examiner—Archie E. Williams, Jr.
Attorney, Agent, or Firm—William E. Hiller; Leo Heiting; Melvin Sharp

[57] ABSTRACT

A portable educational device that is adapted to be used in conjunction with a counter (12) having a display (14) and a keyboard (16) for input of data. A memory slot (18) or an alternate port (19) is provided on the computer (12) to receive the educational device (20). Educational device (20) contains a keypad (24) and a display (26) and operates independent of the computer (12). The educational device (20) includes a central processing unit (48), a Read Only Memory (42) and a Random Access Memory (44). A primary power source (54) supplies power to the educational device (20) during the operation thereof. A back-up power source (56) provides power to the Random Access Memory (44) to form a non-volatile memory for retention of data during periods of non-use. A connector (34) interfaces with the computer (12) to allow the computer (12) to address the Random Access Memory (44) to retrieve data stored therein and to store data at selected locations therein for use by the Central Processing Unit.

15 Claims, 6 Drawing Figures

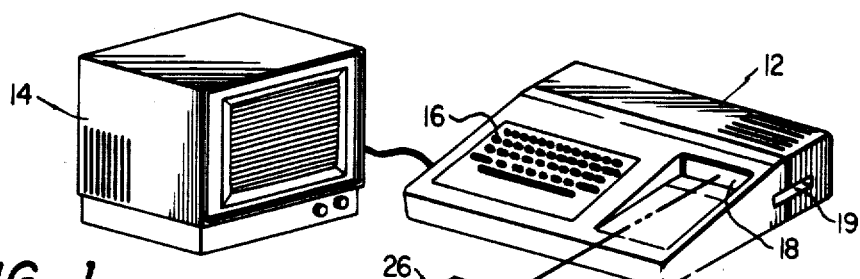
FIG. 1
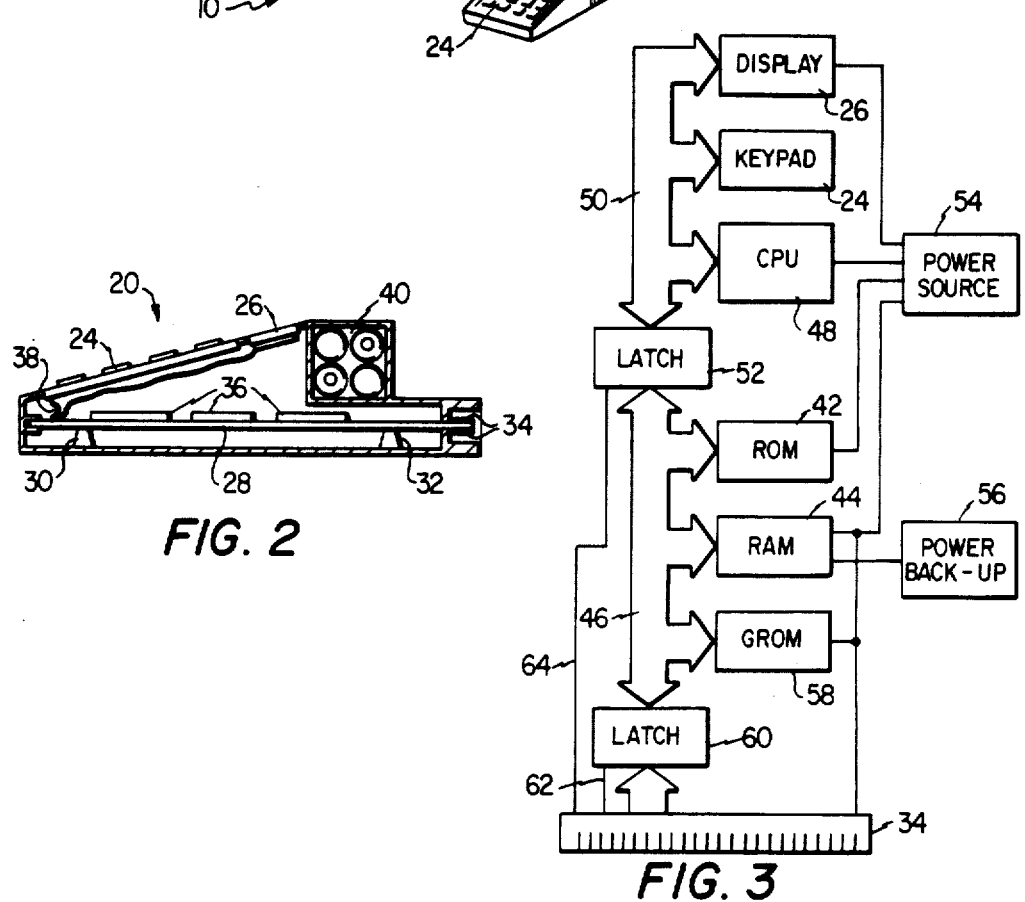
FIG. 2
FIG. 3
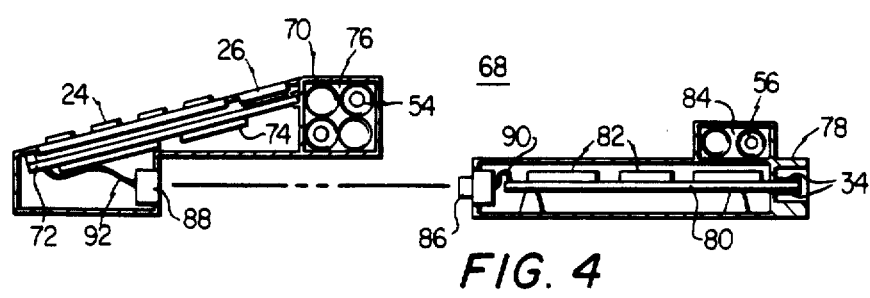
FIG. 4

DATA PROCESSING DEVICE HAVING MEMORY SELECTIVELY INTERFACING WITH COMPUTER

TECHNICAL FIELD

This invention relates in general to portable data processing devices used in conjunction with a computer for computer-assisted education, and more particularly to a portable data processing device having a random access memory for selective interfacing with the central processing unit of a computer such that either the data processing device or the computer when electrically coupled thereto is capable of writing into and reading data from the random access memory when enabled.

BACKGROUND OF THE INVENTION

Computers have become a significant tool in education. Education-oriented computers range from multi-function personal computers to dedicated hand held computational devices. Personal computers are used to teach a wide variety of complex subjects, in addition to providing testing and analyzation functions. Hand held devices may perform simpler educational functions such as spelling and mathematical quizzes. Quizzes presented via hand held computers generally provide a prompt to the user to input an answer through a keyboard, with a reward if the correct answer is given. Hand held computers however usually are not able to analyze substantial amounts of data.

Hand held devices have thus been incorporated into a larger integrated educational system including a personal computer in order to analyze test response data. In such case, hand held devices are normally hardwired to a centralized personal computer. When so connected, hand held devices do not operate independent of the central computer but, rather, depend on the central computer for both control functions and data storage. If the hand held device is disconnected from the central computer, data stored herein is lost and the device becomes inoperable.

The central computer in such integrated educational systems normally includes a main Central Processing Unit (CPU) to control the functions thereof. Each of the interconnected hand held devices may have a secondary CPU associated therewith for performance of functions, such as keyboard scanning which are independent of the main CPU. However, the secondary CPU still shares common data and address busses with the main CPU and is thus dependent on the main CPU.

The requirement of hard wiring hand held devices to the central computer provides severe limitations on the utilization of the hand held devices. There thus exists a need for an educational system utilizing hand held devices which may interface with a centralized computer, but which have the capability to operate independently of the centralized computer.

SUMMARY OF THE INVENTION

The present invention comprises a portable educational device for interfacing with a computer. The portable educational device includes a non-volatile memory for storing data therein and a keypad for inputting data for storage in the nonvolatile memory. A central processor is provided for controlling the operation of the portable educational device and the storage of data in a non-volatile memory. A primary power source supplies power to the portable educational device during operation thereof, with the non-volatile memory retaining data independent of the operation of the power source. The portable educational device interfaces with the computer through a connector that allows the computer to access the data stored in the non-volatile memory for analysis thereof.

In an alternate embodiment of the present invention, the non-volatile memory comprises a Random Access Memory with a battery back-up power source connected thereto. The battery back-up power source provides power when the primary power source is disconnected such that data stored therein is not lost. The central processing unit in the portable educational device interfaces with a Read Only Memory which contains programmed instructions for the operation thereof. In response to these programmed instructions, the central processing unit transfers data input on a keypad to selected locations in the Random Access Memory for later retrieval by the computer.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a perspective view of an educational system in accordance with the present invention;

FIG. 2 illustrates a cross-sectional view of the portable educational device in accordance with the present invention;

FIG. 3 illustrates a schematic block diagram of the portable educational device;

FIG. 4 illustrates a cross-sectional view of an alternate embodiment of the portable educational device in accordance with the present invention;

DETAILED DESCRIPTION OF THE INVENTION

Figure 5:
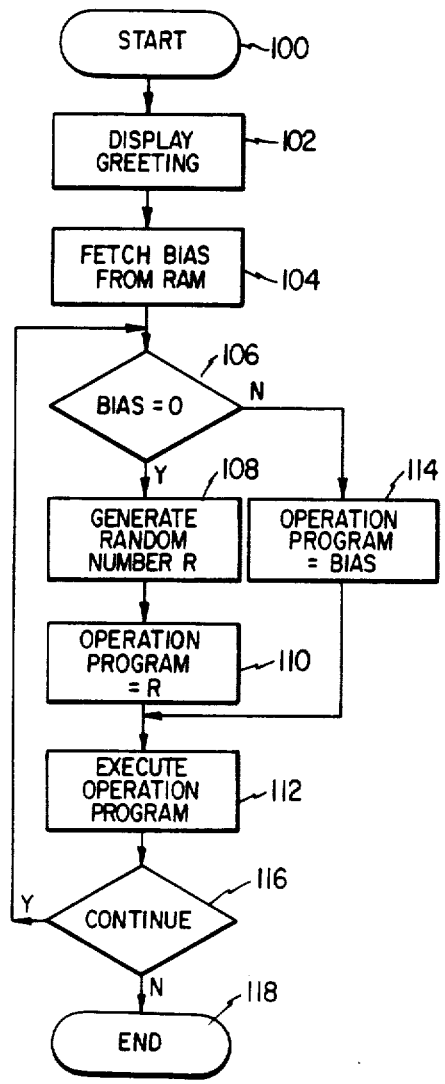
FIG. 5 illustrates a flow chart depicting the operation of the main program of the portable educational device.

Referring now to FIG. 1, there is illustrated a perspective view of an educational system of the subject invention generally designated by the reference numeral 10. The system 10 includes a computer 12 with an associated display 14. The computer 12 can be any suitable type such as the personal TI 99-4/A computer manufactured by Texas Instruments Inc. The computer 12 has a keyboard 16 for input of data and a portable memory slot 18 for receiving a portable educational device 20. The memory slot 18 provides an interface between the portable educational device 20 for access of the information contained therein, as will be described hereinbelow. In addition, the computer 12 has an alternate port 19 for interface with the educational device 20. The educational device 20 has a keypad 24 for data entry and a display 26 for displaying data to a user of the educational device 20.

In operation, a user such as a student is given the educational device 20 apart from the computer 12. The user then activates the educational device 20 and a program stored internal thereto is initiated. This program can be any type of conventional education oriented program that requires a response from the user. For example, a set of simple mathematic problems which require a response can be presented to the user on the display 26. The responses are entered on keypad 24 and are stored internally in the educational device for later access by the computer 12. After use, the user deactivates the educational device 20 and then inserts it into the memory slot 18 or port 19. The computer 12 then initiates an analysis program internal thereto that accesses the stored response data in the educational device 20 and determines the integrity thereof. After analysis, the computer 12 may then supply a "perk" to the user in one of several forms. In one form, the computer 12 may allow the user access to a video game routine that is stored in the educational device if the correct responses were provided by the user. Alternately, the computer 12 may store feedback information in the educational device 20 that allows the user to use the educational device 20 at a different level, depending upon the complexity of the problems.

Referring now to FIG. 2, there is illustrated a sectional view of the portable educational device 20. The educational device 20 has a printed circuit (PC) board 28 disposed therein and mounted on supports 30 and 32. Plating is provided on one end of the PC board 28 to form a connector 34 for interfacing with the computer 12. The connector 34 is commonly referred to as an "edge" connector. The computer 12 has a mating connector internal to the memory slot 18 for mating with the connector 34. Alternate card connector positions are required if other computer ports are utilized. The PC board 28 has electronic circuit elements 36 (including memory elements to be later described) disposed thereon and is interconnected to the keypad 24 and display 26 by a signal line 38. A compartment 40 is provided to contain a power source for operation of the educational device independent of the computer 12.

Referring now to FIG. 3, there is illustrated a schematic block diagram of the portable educational device 20. A Read Only Memory (ROM) 42 and a Random Access Memory (RAM) 44 are disposed on PC board 28 within the educational device 20. The ROM 42 and the RAM 44 communicate with a signal bus 46. The signal bus 46 is a combined data bus and address bus and, hereinafter, "signal" bus shall refer to this combination.

A central processing unit 48 (CPU) is also disposed on the PC board 28 within the educational device 20 and is in communication with the display 26 and keypad 24 through a signal bus 50. The CPU 48 supplies data to the display 26 and receives data from the keypad 24. The signal bus 50 is in communication with the signal bus 46 through a latch 52. The latch 52, when enabled, places the CPU 48 in communication with the ROM 42 and the RAM 44. If desired, latch 52 may be disabled to disengage the CPU 48.

A power source 54, such as a battery, is connected to the ROM 42, the RAM 44, the keypad 24 and the CPU 48 to provide power therefor. The RAM 44 is a volatile memory device, that is, removal of power erases the contents therein. Thus a back-up power source 56 is connected to RAM 44. The RAM 44, in conjunction with the back-up power source 56, provides a nonvolatile memory that is portable and independent of the power source 54. The back-up power source 56 supplies sufficient power to maintain information in the RAM 44 when the power source 54 is not functional. The power source 54 may be derived from the computer 12 depending upon the particular application.

In addition to the ROM 42 and the RAM 44, a Graphics Read Only Memory (GROM) 58 is also in communication with the signal bus 46. As will be described hereinbelow, the GROM 58 contains program instructions for use by the computer 12. The signal bus 46 is connected to a latch 60 which, when enabled, connects the connector 34 to the signal bus 46, thereby allowing the computer 12 to gain access to information stored in the RAM 44. A signal line 62 is connected between the connector 34 and the enable input of the latch 60. A signal line 64 is connected between the connector 34 and the enable input of latch 52. In this configuration, the computer 12 can remove the CPU 48 from communication with the signal bus 46 and control the addressing operation of the RAM 44. By this selective latching of the latches 52 and 60, either the CPU 48 or the computer 12 is allowed to gain access to the RAM 44. Since the RAM 44 can only be controlled by one control device at a time, the latches 52 and 60 provide the necessary isolation between control devices.

In the preferred embodiment, the CPU 48 is a microprocessor of the type Model No. TMS 7000 manufactured by Texas Instruments Inc. The GROM 58 is of the type TMS 4764 and the ROM 42 is of the type TMS 2532 manufactured by Texas Instruments Inc. The RAM 44 is of the type HM 6116 manufactured by Hitachi.

In operation, the ROM 42 contains a ROM resident program which is utilized by the CPU 48 to perform the various functions thereof. For example, scanning of the keyboard 24, performing READ and WRITE instructions to the RAM 44 and updating the display 26 are performed under control of the CPU 48 in response to the instructions programmed into the ROM 42. Response data input to the keypad 24 and processed by the CPU 48 is stored in the RAM 44. After disconnection of the power source 54, this response data is retained therein through use of the back-up power source 56. This data is then accessible by the computer 12 through the connector 34. In addition, the computer 12 can WRITE to the RAM 44 and dispose data at select address locations in the RAM 44 for access by the CPU 48. These address locations are stored in the ROM 42 and are part of the internal programs thereof.

One application of the system 10 is in an educational environment wherein a plurality of educational devices 20 are supplied to a number of users or "students". Each of the students gains access to the ROM resident program 42 by turning the device on and connecting the power source 54 to activate the CPU 48, the ROM 42 and the RAM 44. Once the power is turned on, the program in the ROM 42 is initiated and the CPU 48 can control the display 26 to prompt the student to depress a sequence of keys on the keypad 24. Depending upon the type of program in the ROM 42, the sequence of keys depressed by the student generates data that is stored in the RAM 44. This data can be the answer to particular questions stored in the ROM 42 as a predefined "quiz".

After inputting of all the required responses, the student then turns the power source 54 off and, when convenient, places the educational device 20 into the memory slot 18 or alternate port 19 of the computer 12. The computer 12 then accesses the data in the RAM 44 and processes the data through use of an internal program therein. The internal program in the computer 12 analyzes the data stored in the RAM 44 and, as described above, may allow the student access to a game routine contained in GROM 58 as a "perk" or reward to the student.

Referring now to FIG. 4, there is shown a sectional view of an alternate embodiment of the educational device 20 of FIGS. 1-3, wherein like numerals refer to like parts in the various figures. The educational device illustrated in FIG. 4 is generally indicated by the reference numeral 68 and is segmented into two parts. The first part comprises a housing 70 for containing a PC board 72 with electronic components 74 attached thereto, the keypad 24 and the display 26. The electronic components 74 are representative of the CPU 48 and the latch 52. A compartment 76 houses the primary power source 54, which is illustrated as a plurality of batteries. The second part comprises a housing 78 which contains a PC board 80 with the connector 34 formed thereon and electronic components 82 attached thereto. The electronic components 82 are representative of the ROM 42, the RAM 44, the GROM 58 and the latch 60. The power back-up source 56 is also contained within the housing 78 in a compartment 84.

A connector 86 is disposed on the opposite end of the housing 78 from the connector 34 and a mating connector 88 is disposed on the housing 70 for mating with the connector 86. A connecting lead 90 is functional to connect the components 82 on the PC board 80 with the connector 86. A connecting lead 92 is functional to connect the components 74 on the PC board 72 with the connector 88. The connectors 86 and 88 and the connecting leads 90 and 92 allow the components 74 and 82 on the PC boards 72 and 80, respectively, to function in the configuration of FIG. 3. When the connectors 86 and 88 are separated, the housing 78 including components 82, which are comprised of the ROM 42, the GROM 58, the RAM 44, the latch 60, and the back-up power source 56, can then be inserted into the memory slot 18 or alternate port 19 on the computer 12. In this manner, the user may retain the keypad 24, the display 26 and the CPU 48 which are enclosed in the housing 70.

In a typical operation of the invention, a mathematical quiz is formulated that tests a user's knowledge of multiplication tables for integers from 1 to 10. Each of the multiplication tables is defined by problems in a particular subroutine that is stored in the ROM 42. After initiation of the program, one of the multiplication table subroutines is randomly selected and a two number problem is displayed on display 26. The user is then prompted to input the product or answer on the keypad 24. This prompt may be in the form of an alphanumeric display or a form of synthesized speech. After inputting the response, it is converted to an appropriate format and stored in the RAM 44 at a select address location. Depending upon the particular program in the ROM 42, the educational device 20 may indicate to the user that he has given the correct or incorrect answer. The educational device 20 then steps to the next multiplication problem.

After the user has completed all of the multiplication problems that are presented to him, he then deactivates the educational device 20 and inserts it into the memory slot 18 or alternate port 19 on the computer 12. The internal CPU 48 is deactivated and the CPU of the computer 12 is connected to control the memory within the device 20. The computer 12 is then activated by the user to initiate an analysis program stored internal to the computer 12. This analysis program retrieves the data stored in the RAM 44 to determine the integrity of the results. If the results show a high degree of incorrect responses, the computer 12 analyzes the responses to determine which multiplication table the user is deficient in. The computer 12 then stores a "bias" number in an allocated address location in the RAM 44 to bias the program in the ROM 42 for testing of a particular multiplication table rather than randomly selecting from all of the multiplication tables for each problem presented to the user. The user then repeats the testing procedure apart from the computer 12 to begin the cycle over.

If the computer 12 determines that the number of correct responses is adequate, the GROM 58 is addressed. The GROM 58 contains a conventional game program tha tinterfaces with the computer 12. Access to the program stored in the GROM 58 constitutes the reward for having a large number of correct responses. The student is then allowed to play the game stored in the GROM 58.

Referring now to FIG. 5, a flow chart is illustrated for the main program stored in the ROM 42. The program is initiated with a START block 100 when the primary power source 54 is activated. After initiation, the program flows to a function box 102 to display a greeting such as "Multiplication Quiz". After displaying this greeting, the program proceeds to a function block 104 to fetch the bias number from a predetermined address location in the RAM 44. As described above, this bias number determines if one multiplication table should preferentially be tested rather than testing for all of the multiplication tables.

After fetching the bias instruction, the program proceeds to a decision block 106 to determine whether the bias number is greater than zero. A bias number equal to zero indicates that the problem should randomly select one of the multiplication tables subroutines for execution thereof and the program then flows along the "Y" path to a function block 108. The function block 108 indicates the step wherein a software random number generator generates a random number "R". The program then proceeds to a function block 110 to select the particular subroutine that is stored in the ROM 42 that corresponds to a particular proglem set for one of the multiplication tables. These subroutines are called "Operation Programs". After selection of the Operation Program to be utilized, the program proceeds to a function block 112 to execute the Operation Program.

If the computer 12 has stored a bias number other than zero in the predetermined address location in the RAM 44, the program flows from the decision block 106 along the "N" path thereof to a function block 114. The function block 114 selects the Operation Program in accordance with the number stored in the bias address location. After selection of the Operation Program, the program proceeds to the input of the function block 112 to execute the selected Operation Program. By following the "N" path from the decision block 106, the random number generator of function block 108 is bypassed.

After executing the particular Operation Program, the program proceeds to a decision block 116 to determine whether another Operation Program is to be selected. If so, the program flows along the "Y" path to the input of the decision block 106 and, if no additional Operation Programs are to be executed, the program flows along the "N" path to a termination block 118 labeled END.

Figure 6:
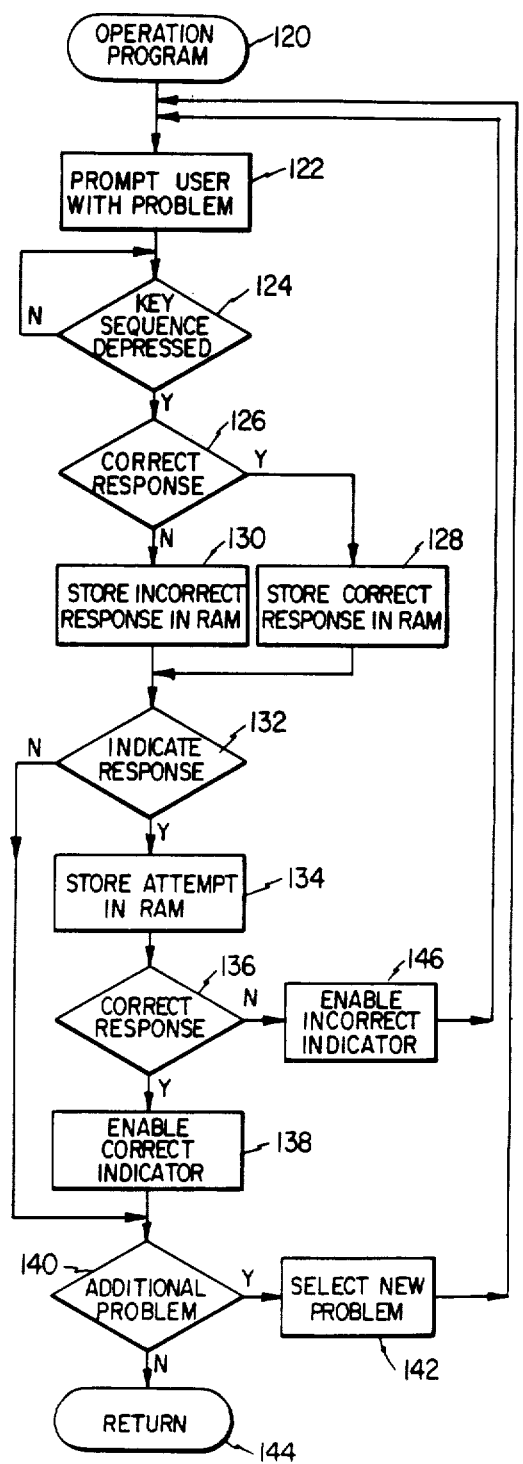
FIG. 6 illustrates a flow chart depicting the storage of information in the portable Random Access Memory.

Referring now to FIG. 6, there is illustrated a flow chart for the subroutine for the Operation Program that is executed in the function block 112 of FIG. 5. The subroutine is initiated at a START block 120 labeled OPERATION PROGRAM. After initiation, the program flows to a function block 122 wherein a prompt is provided to the user for a problem. This prompt can be in the form of two numbers that are displayed on the display 26 and separated by a predetermined distance. For example, if the Operation Program selected is the multiplication table for 2, the problem can display a 2 and a 4 to represent the multiplication problem 2×4. After displaying this prompt, the program proceeds to a decision block 124 to determine if a correct key sequence for the response to pressed.

Decision block 124 represents a key scanning subroutine wherein the CPU 48 scans the keypad 24 to determine the column and row of the key or keys selected. Until a key sequence is depressed, the program flows along the "N" path back to the input of decision block 124. When the correct key sequence occurs, the program proceeds along the "Y" path to a decision block 126 to determine if there is a correct response. If the user has depressed the appropriate key sequence necessary for a correct response, the program flows along the "Y" path to a function block 128 to store the correct response in the RAM 44 at a predetermined address location. This stored response can be a digital word representative of the number selected or it can be representative of the actual row and column address for the depressed key on the keypad 24.

If an incorrect response was input, the program proceeds from the decision block 126 along the "N" path thereof to a function block 130. The function block 130 stores the incorrect response in the RAM 44 at a predetermined address location therein. To differentiate between incorrect and correct responses, an identifier can be stored with each stored response as part of a digital word stored therein such that the computer 12, when gaining access to the RAM 44, can determine the type of response given and also the particular problem.

After storing the incorrect or correct response, the program proceeds to the input of a decision block 132 to determine whether to indicate to the user the correctness or incorrectness of his response. This can be accomplished by storage of a particular digital word in one of the address locations of the RAM 44 by the computer 12 which sets a "flag" that is recognized by the program in the ROM 42. If a response is to be indicated, the program proceeds along the "Y" path from the decision block 132 to a function block 134 to store the number of the attempts made by the user to properly respond to the particular problem. The number of attempts are stored in the RAM 44. Determination of the number of attempts can be in the form of a software register that is incremented for each attempt in conjunction with the particular problem.

After storing the attempts, the program then proceeds to the input of a decision block 136 to determine whether the response was correct or incorrect. If correct, the program proceeds along the "Y" path to a function block 138 to enable the "correct indicator". This correct indicator can be an audible speech or tone or a message that is displayed on the display 26. After indicating a correct response, the program proceeds to the input of a decision block 140 to determine whether an additional problem is to be selected. If an additional problem is to be selected, the program proceeds to a function block 142 to select a new problem within the particular Operation Program and then returns to the input of the function block 122 to prompt the user with the selected problem. If no additional problem in the particular Operation Program is to be solved, the problem proceeds from the decision block 140 along the "N" path thereof to the input of a RETURN block 144 for return to the main program.

If an incorrect response has been received, the program proceeds from the decision block 136 along the "N" path thereof to the input of a function block 146 to enable the "incorrect indicator". This incorrect indicator can be a flashing display with a message such as "Try Again". After displaying this incorrect indicator, the program proceeds to the input of the function block 122 to again prompt the user with the same problem. The user continues to make attempts at providing the correct response for the problem until he has made the correct response at which time the program proceeds along the "Y" path from the decision block 136 to select another problem.

The function block 134, as described above, indicates storage of the number of attempts in the RAM 44. This data is available to the computer 12 to determine how many attempts were required by the user to solve a given problem. However, if the particular set of problems stored in the ROM 42 does not allow more than one response per problem, the program will flow from the decision block 132 to the input of the decision block 140 to bypass the correct or incorrect indicators, thereby preventing the student from giving more than one response to a given problem.

After completing all of the Operation Programs, the educational device 20 is inserted into the memory slot 18 or alternate port 19 on the computer 12. The computer 12 then accesses the selected addresses in the RAM 44 to analyze the number of correct and incorrect responses or the number of attempts necessary to achieve a correct response to each problem. Depending upon predetermined criteria, the computer 12 can reward the user, as described above, by activating the GROM 58, thereby allowing the student access to a particular game routine or the like. If, however, the responses do not meet the predetermined criteria, the computer 12 can then WRITE a number to the bias address location in the RAM 44 such that a particular multiplication table is preferentially tested when operating the main program in the ROM 42.

In summary, an educational device has been provided that allows a user to step through a particular program that requires responses. The responses are input on a keypad and are stored in a non-volatile READ/WRITE memory. After storing the data, the non-volatile memory can be inserted into a computer to allow the computer access to the data stored therein. This data can then be analyzed to determine if the responses provided by the user were correct. Depending upon the accuracy of the responses stored in the non-volatile memory, the computer can then input new data into the non-volatile memory to manipulate the operating program of the educational device, thereby requiring different responses from the user. However, if the responses meet a predetermined criteria, the user can be rewarded by allowing him access to some form of game routine.

Although the preferred embodiment has been described in detail, it should be understood that various changes, substitutions and alterations can be made therein without departing from the spirit and scope of the invention as defined by the appended claims.

What is claimed is:

1. A portable data processing device for selective interfacing with a digital computer, said portable data processing device comprising:

central processing means for controlling the operation of the device;

operator input means operably coupled to said central processing means for introducing input data from a user into the device for processing by said central processing means;

presentation means operably coupled to said central processing means for providing data information to the user;

memory means for storing data therein for subsequent accessing by said central processing means;

a primary power source operably coupled to said central processing means and said memory means;

first circuitry means interposed between said central processing means and said memory means for providing communication between said central processing means and said memory means in a first state to enable said central processing means to access data from said memory means and for prohibiting communication between said central processing means and said memory means in a second state;

connector means for electrical coupling to the computer, said connector means being operably coupled to said memory means, said primary power source, and said first circuitry means for interfacing the portable data processing device with the computer;

second circuitry means interposed between said memory means and said connector means for providing communication between said memory means and the computer in a first state to enable the computer to access data from said memory means when said connector means is electrically coupled to the computer and for prohibiting communication between said memory means and the computer in a second state;

said first and second circuitry means being operable in tandem such that only one of said central processing means or the computer can access said memory means at one time;

said memory means including a non-volatile read-only-memory having program instructions stored therein for access by said central processing means in controlling the operation of the device, and a random access memory for storing data therein and being alternatively accessible by said central processing means or the computer when electrically coupled to said connector means depending upon the states of said first and second circuitry means such that either said central processing means or the computer is capable of writing data into and reading data from said random access memory when enabled; and a back-up power source connected to said random access memory to provide power thereto for preserving data stored therein when said primary power source has been rendered inoperable.

2. A portable data processing device as set forth in claim 1, wherein said central processing means comprises a microprocessor.

3. A portable data processing device as set forth in claim 1, wherein said operator input means comprises a keypad having a plurality of individual keys respectively representative of alphanumeric units for selective actuation by the user in introducing data into the device for processing by said central processing means.

4. A portable data processing device as set forth in claim 1, wherein said presentation means comprises a display means controlled by said central processing means for displaying data information to the user.

5. A portable data processing device as set forth in claim 1, wherein said back-up power source comprises a battery.

6. A portable data processing device as set forth in claim 1, wherein the program instructions stored in said read-only-memory of said memory means include instructions to the user as to the operational sequence of said device;

said central processing means being effective to access said program instructions concerning the operational sequence of the device from said read-only-memory when said first circuitry means is in its first state to provide prompt information as to respective user steps in the operational sequence of the device as accessed from said program instructions stored in said read-only-memory; and said presentation means providing the prompt information to the user in an intelligible form in response to said program instructions stored in said read-only-memory as accessed by said central processing means.

7. A portable data processing device as set forth in claim 1, wherein said device is an educational device, and said read-only-memory of said memory means has program instructions stored therein representative of problems to be posed to the user via said presentation means upon access by said central processing means;

said operator input means being effective to receive the user response as a solution to the posed problem introduced as input data from the user into the device.

8. A portable data processing device as set forth in claim 7, wherein said memory means further include a graphics read-only-memory having program instructions stored therein directed to an amusement routine and normally inaccessible to the user of the device, said graphics read-only-memory being responsive to a control signal from the computer when the computer is electrically coupled to said connector means in an enabled state to become accessible to the user for utilization.

9. A portable data processing device as set forth in claim 8, wherein said graphics read-only-memory of said memory means contains program instructions for a game routine stored therein subject to access for utilization by the user in playing the game dependent upon the user providing as input data a correct solution to problems posed by the device of a sufficient percentage thereof to cause said graphics read-only-memory to be rendered active via a control signal from the computer.

10. A portable data processing device as set forth in claim 1, further including a segmental housing having first and second individual housings adapted to interfit with each other in mating relationship, said first housing having said operator input means operably disposed thereon, and said central processing means and said primary power source disposed therein, and said second housing having said memory means, said connector means and said back-up power source disposed therein;

electrical connection means interposed between said first and second housings for electrically coupling said first and second circuitry means thereof together so as to electrically interconnect the components of said first and second housings, said second housing being removable from said first housing by disengaging said electrical connection means therebetween for interfacing with the computer through said connector means such that said random access memory of said memory means may be exclusively accessed by the computer while said second housing is electrically disconnected from said first housing.

11. A portable data processing device as sat forth in claim 10, wherein said electrical connection means comprises a first electrical connector and a second electrical connector respectively mounted on the first and second housings comprising said segmental housing, said first electrical connector engaging said second electrical connector when said first and second housings are interfitted with each other in mating relationship to electrically interconnect the components of said first and second housings.

12. A portable data processing device as set forth in claim 10, wherein said central processing means comprises a microprocessor.

13. A portable data processing device as set forth in claim 10, wherein said operator input means comprises a keypad having a plurality of individual keys respectively representative of alphanumeric units for selective actuation by the user in introducing data into the device for processing by said central processing means.

14. A portable data processing device as set forth in claim 10, wherein said presentation means comprises a display means controlled by said central processing means for displaying data information to the user.

15. A portable data processing device as set forth in claim 10, wherein said back-up power source comprises a battery.

* * * * *